United States Patent
Lim et al.

(10) Patent No.: US 10,386,043 B1
(45) Date of Patent: Aug. 20, 2019

(54) OUTER DISPLAY LIGHTING APPARATUS OF VEHICLE

(71) Applicants: Hyundai Motor Company, Seoul (KR); Kia Motors Corporation, Seoul (KR)

(72) Inventors: Jung Wook Lim, Seoul (KR); Byoung Suk Ahn, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/178,193

(22) Filed: Nov. 1, 2018

(30) Foreign Application Priority Data

May 18, 2018 (KR) .......................... 10-2018-0057172
Jul. 20, 2018 (KR) .......................... 10-2018-0084657

(51) Int. Cl.
| | |
|---|---|
| *B60Q 1/26* | (2006.01) |
| *F21V 7/04* | (2006.01) |
| *F21V 14/04* | (2006.01) |
| *F21V 23/00* | (2015.01) |
| *B60Q 1/50* | (2006.01) |

(52) U.S. Cl.
CPC ............ *F21V 14/04* (2013.01); *B60Q 1/2615* (2013.01); *B60Q 1/50* (2013.01); *F21V 7/04* (2013.01); *F21V 23/003* (2013.01); *B60Q 2400/50* (2013.01)

(58) Field of Classification Search
None
See application file for complete search history.

(56) References Cited

U.S. PATENT DOCUMENTS

| | | | |
|---|---|---|---|
| 2018/0009374 A1* | 1/2018 | Kim ................... | G03B 21/2053 |
| 2018/0154819 A1* | 6/2018 | Hoshino ................ | B60Q 1/085 |

FOREIGN PATENT DOCUMENTS

KR   10-2018-0041103 A   4/2018

* cited by examiner

*Primary Examiner* — Dedei K Hammond
(74) *Attorney, Agent, or Firm* — Morgan, Lewis & Bockius LLP

(57) ABSTRACT

An external display lighting apparatus of a vehicle, may include a light source emitting light; a scanning mirror reflecting the light emitted from the light source to change a traveling path of the light and configured to rotate by a predetermined angle to scan an image of reflected light; and a reflector provided such that the light reflected by the scanning mirror is incident thereupon and the incident light is reflected off a road surface, the reflector being configured to be rotatable such that the light is projected onto the road surface around the vehicle.

18 Claims, 9 Drawing Sheets

OUTER DISPLAY LIGHTING APPARATUS OF VEHICLE

CROSS REFERENCE TO RELATED APPLICATION

The present application claims priority to Korean Patent Application Nos. 10-2018-0057172, filed May 18, 2018 and 10-2018-0084657, filed Jul. 20, 2018, the entire contents of which is incorporated herein for all purposes by this reference.

BACKGROUND OF THE INVENTION

Field of the Invention

The present invention relates to an external display lighting apparatus of a vehicle, which displays current driving conditions and a current driving state of the vehicle to be seen by pedestrians and/or drivers of other vehicles.

Description of Related Art

In general, a vehicle is provided with lighting apparatuses for allowing a driver to clearly identify an object in a direction of driving during nighttime driving and for informing pedestrians and/or drivers of other vehicles of a driving state of a driver's vehicle.

Such a lighting apparatus is configured to project a specific image on a screen to improve convenience of the driver as well as emitting light, and various functions are combined therewith.

In recent years, autonomous vehicles have been developed and commercialized rapidly. In the case of autonomous vehicles, a driver of a vehicle is allowed to take their hands off a steering wheel and undertake other activities while in an automatic driving mode. This may cause pedestrians and/or drivers of other vehicles to be worried about safety of the autonomous vehicles.

However, there may be a limitation in providing information on current driving conditions and a current driving state of a vehicle only with the lighting apparatuses applied to the vehicle. Additionally, the specific image may be projected only in a predetermined lighting area.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an outer display lighting apparatus of a vehicle, which displays current driving conditions and a current driving state of the vehicle to be seen by pedestrians and/or drivers of other vehicles, thereby achieving an improvement of reliability of the vehicle, the apparatus enabling pedestrians and/or drivers of other vehicles to recognize the current driving state of the vehicle in advance to cope with situations thereafter, thereby achieving an improvement of safety of the vehicle.

According to various aspects of the present invention, there is provided an external display lighting apparatus of a vehicle, the apparatus including: a light source emitting light; a scanning mirror reflecting the light emitted from the light source to change a traveling path of the light and configured to rotate by a predetermined angle to scan an image of reflected light; and a reflector provided such that the light reflected by the scanning mirror is incident thereupon and the incident light is reflected off a road surface, the reflector being configured to be rotatable such that the light is projected onto the road surface around the vehicle.

The light source, the scanning mirror, and the reflector may be positioned at a lower portion of the vehicle.

The scanning mirror may be a micro-mirror configured such that the micro-mirror oscillates in X-axis and Y-axis directions to cause the light emitted from the light source to change in a reflection angle thereof, creating the image.

The reflector may include: a reflecting portion provided to have an inclined surface or a curved surface; and a driving portion having the reflecting portion provided thereon and transmitting rotational power to the reflecting portion such that the reflecting portion is rotated in 360 degree angles with respect to a vertical axis.

The light source may be provided to emit the light in a longitudinal direction of the vehicle, the scanning mirror may be positioned in a horizontal direction of the light source and is provided such that the light emitted from the light source is reflected thereby and travels in a height direction of the vehicle, and the reflector may be positioned in a vertical direction of the scanning mirror and is provided such that the light reflected by the scanning mirror is projected onto the road surface.

The light source, the scanning mirror, and the reflector may be configured as a single module, such that the light source and the scanning mirror are rotated in conjunction with a rotation of the reflector in 360 degree angles.

The apparatus may further include a rotary bracket rotatably mounted on the vehicle and on which the light source, the scanning mirror, and the reflector are provided, wherein the rotary bracket may be configured such that a first side thereof is provided with the light source and a second side thereof is provided with the scanning mirror, and the reflector may be positioned above or below the light source and the scanning mirror.

The rotary bracket may be connected at an upper or lower end portion thereof with an actuating portion transmitting rotational power to the rotary bracket, such that the rotary bracket is rotated with respect to the vertical axis.

The rotary bracket may have an extending portion extending upwardly or downwardly from the first side thereof, the extending portion having the reflector provided thereon, such that the light emitted from the light source travels to the second side to be incident upon the scanning mirror and then the light reflected by the scanning mirror travels downward to the first side to be incident upon the reflector.

The apparatus may further include a housing secured to the vehicle and covering the light source, the scanning mirror, and the reflector, the housing having a circumferential surface provided with a lens projecting the light.

The apparatus may further include a controller configured for controlling an on/off state of the light source, operation of the scanning mirror, and a rotational position of the reflector, the controller configured for controlling the light source, the scanning mirror, and the reflector by receiving information on current driving conditions and a current driving state of the vehicle such that the information on the current driving conditions and the current driving state of the vehicle is projected onto the road surface around the vehicle in a form of an image.

According to various aspects of the present invention, there is provided an external display lighting apparatus of a vehicle, the apparatus including: a light source emitting light; a scanning mirror reflecting the light emitted from the light source to change a traveling path of the light and configured to rotate by a predetermined angle to scan an image of reflected light; and a reflector provided such that the light reflected by the scanning mirror is incident thereupon and the incident light is reflected off a road surface, the reflector being configured to have a curved surface such that the light is projected onto the road surface around the vehicle.

The light source, the scanning mirror, and the reflector may be positioned at a lower portion of the vehicle.

The scanning mirror may be a micro-mirror configured such that the micro-mirror oscillates in X-axis and Y-axis directions to cause the light emitted from the light source to change in a reflection angle thereof, creating the image.

The light source may be provided to emit the light in a vertical direction of the vehicle, the reflector may be positioned in a vertical direction of the light source and has a through portion through which the light emitted from the light source passes, the reflector having a curved portion, and the scanning mirror may be positioned in a vertical direction of the reflector and may reflect the light emitted from the light source and passing through the reflector such that the reflected light travels to the curved surface of the reflector.

The reflector may have a through hole through which the light emitted from the light source passes, and an inclined surface or the curved surface defined radially around the through hole.

The apparatus may further include a housing secured to the vehicle and covering the light source, the scanning mirror, and the reflector, the housing having a circumferential surface provided with a lens projecting the light.

The housing may have a securing bracket provided therein and on which the light source is provided, the scanning mirror may be secured to the housing to be distanced from the securing bracket, and the scanning mirror may be mounted on an internal bottom surface of the housing in a vertical direction of the light source.

The apparatus may further include a controller configured for controlling an on/off state of the light source and operation of the scanning mirror, the controller configured for controlling the light source and the scanning mirror by receiving information on current driving conditions and a current driving state of the vehicle such that the information on the current driving conditions and the current driving state of the vehicle is projected onto the road surface around the vehicle in a form of an image.

According to the external display lighting apparatus of the vehicle having the above-described configuration, it is possible to display the current driving conditions and the current driving state of the vehicle to be seen by pedestrians and/or drivers of other vehicles, achieving an improvement of reliability of the vehicle. Additionally, it is possible for pedestrians and/or drivers of other vehicles to recognize the current driving state of the vehicle in advance to cope with situations thereafter, achieving an improvement of safety of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
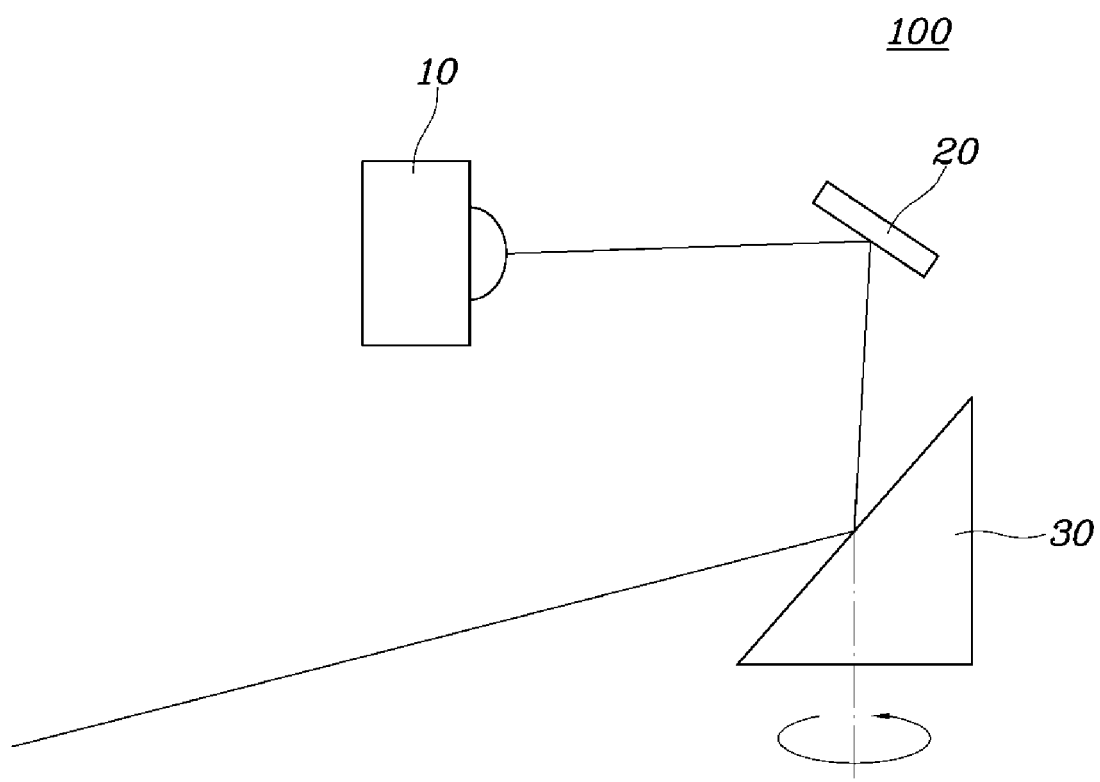
FIG. 1 and FIG. 2 are views showing an external display lighting apparatus of a vehicle according to various exemplary embodiments of the present invention.

It may be understood that the appended drawings are not necessarily to scale, presenting a somewhat simplified representation of various features illustrative of the basic principles of the invention. The specific design features of the present invention as herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, an external display lighting apparatus of a vehicle according to exemplary embodiments of the present invention will be described in detail with reference to the accompanying drawings. Throughout the drawings, the same reference numerals will refer to the same or like parts.

Figure 2:
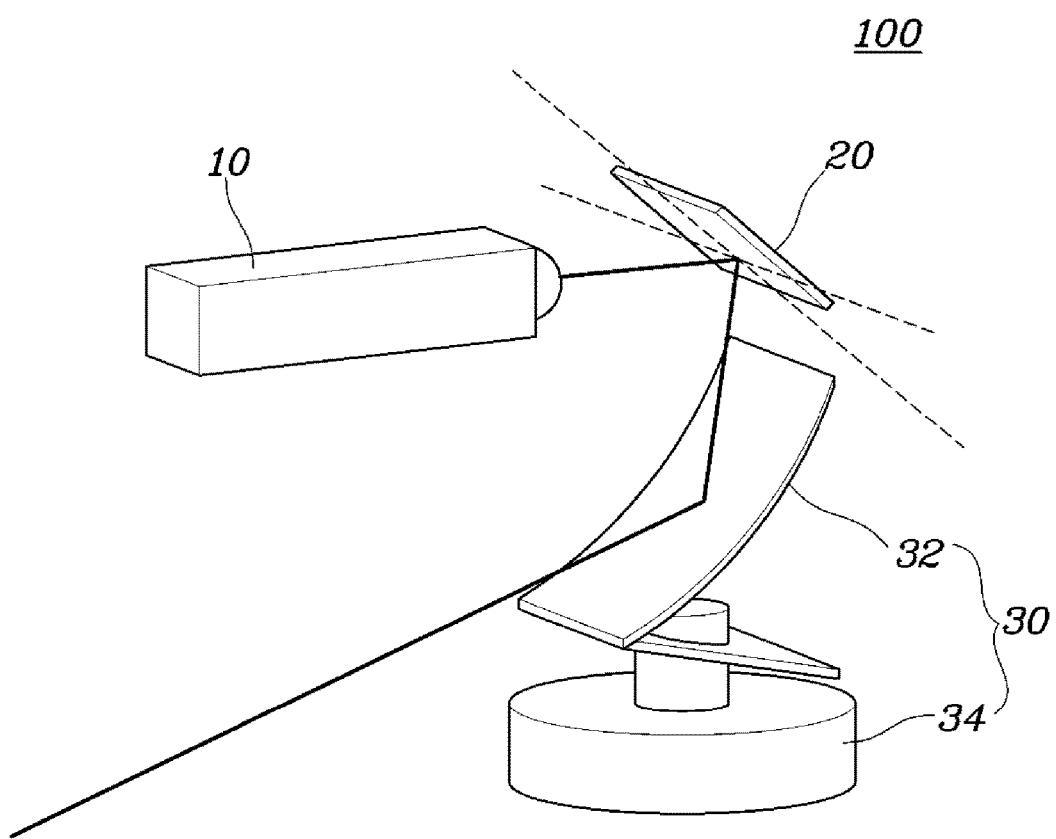

FIG. 1 and FIG. 2 are views showing an external display lighting apparatus of a vehicle according to various exemplary embodiments of the present invention, FIG. 3, FIG. 4, FIG. 5 and FIG. 6 are views showing the external display lighting apparatus of the vehicle shown in FIG. 1, and FIG. 7, FIG. 8 and FIG. 9 are views showing an external display lighting apparatus of a vehicle according to various exemplary embodiments of the present invention.

As shown in FIG. 1 and FIG. 2, an external display lighting apparatus 100 of a vehicle according to various exemplary embodiments of the present invention may include: a light source 10 emitting light; a scanning mirror 20 reflecting the light emitted from the light source 10 to change a traveling path of the light and configured to rotate by a predetermined angle to scan an image of reflected light; and a reflector 30 provided such that the light reflected by the scanning mirror 20 is incident thereupon and the incident light is reflected off a road surface, the reflector being configured to be rotatable such that the light is projected onto the road surface around the vehicle V.

Herein, the light source 10 may be a Light Emitting Diode (LED), and the scanning mirror 20 is positioned such that the light emitted from the light source 10 is incident thereupon. The scanning mirror 20 may be a micro electro mechanical system (MEMS) scanning mirror configured such that the mirror oscillates in X-axis and Y-axis directions to cause the light emitted from the light source 10 to change in a reflection angle thereof, creating an image. The scanning mirror 20 oscillates in the X-axis direction and in the Y-axis direction whereby the light emitted from the light source 10 is implemented as a planar image. In other words, the scanning mirror 20 in which the reflection angle of the light is constantly changed causes the light emitted from the light source 10 to constantly change in direction of travel, creating an image using an afterimage effect. The image scanning technique through the light source 10 and the scanning mirror 20 is well-known in the art, so a detailed description thereof will be omitted.

Figure 3:
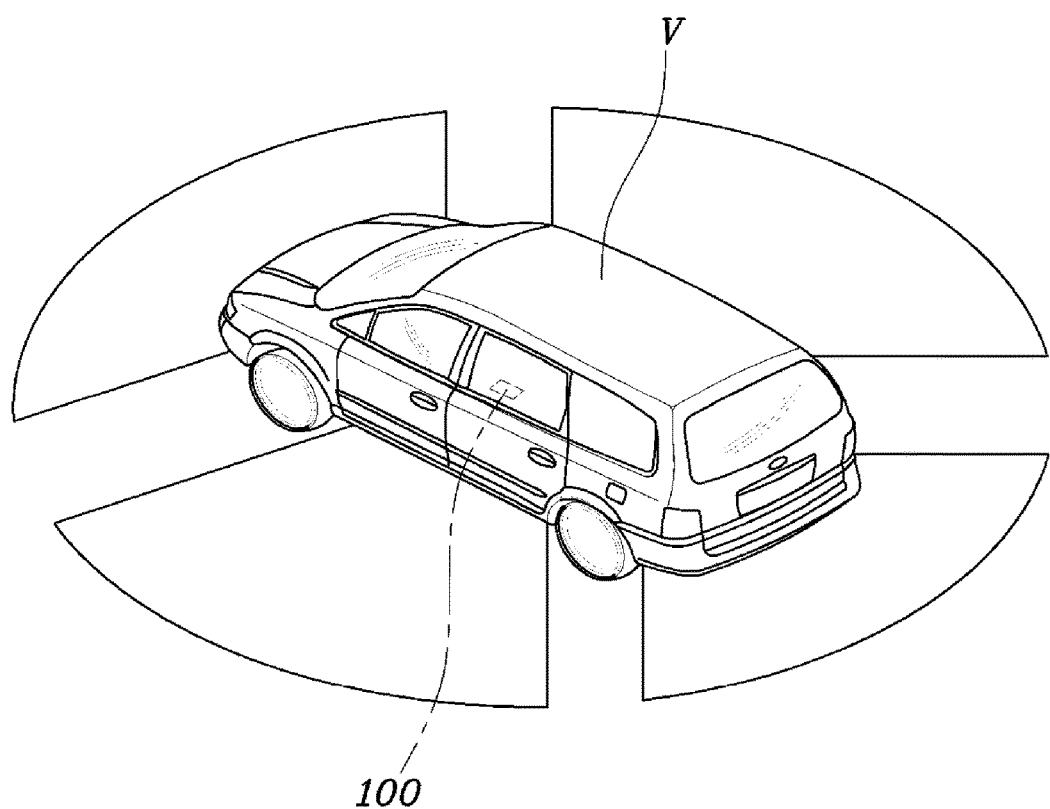
FIG. 3, FIG. 4, FIG. 5 and FIG. 6 are views showing the external display lighting apparatus of the vehicle shown in FIG. 1.
Figure 6:
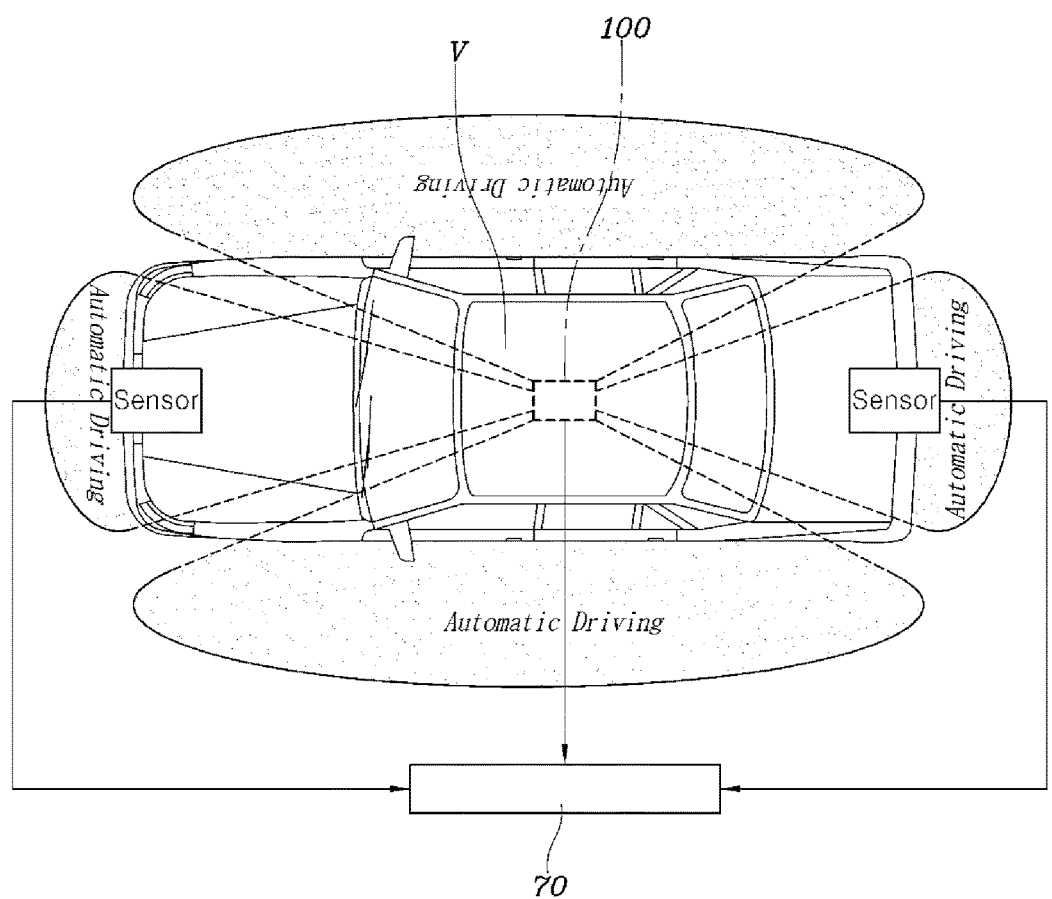

As described above, the reflector 30 is provided in a traveling path of the light emitting the light source 10 and reflected by the scanning mirror 20. The reflector 30 reflects the light that has been reflected by the scanning mirror 20 to be projected onto the road surface around the vehicle V. Since the reflector 30 is configured to be rotatable in 360 degree angles, as shown in FIGS. 3 and 6, the incident light is reflected and projected onto the road surface around the vehicle V. Herein, the light is selectively projected onto portions of the road surface, that is, front, rear, left and right portions of the road surface around the vehicle V. This makes it possible to selectively display the image generated by the scanning mirror 20 around the vehicle V.

In other words, the light reflected by the scanning mirror 20 is selectively projected onto the road surface around the vehicle V according to a rotational position of the reflector 30, resulting in pedestrians and/or drivers of other vehicles ascertaining a message from the vehicle V.

The above-described present invention will be described more in detail. The light source 10, the scanning mirror 20, and the reflector 30 may be positioned at a lower portion of the vehicle V.

Figure 4:
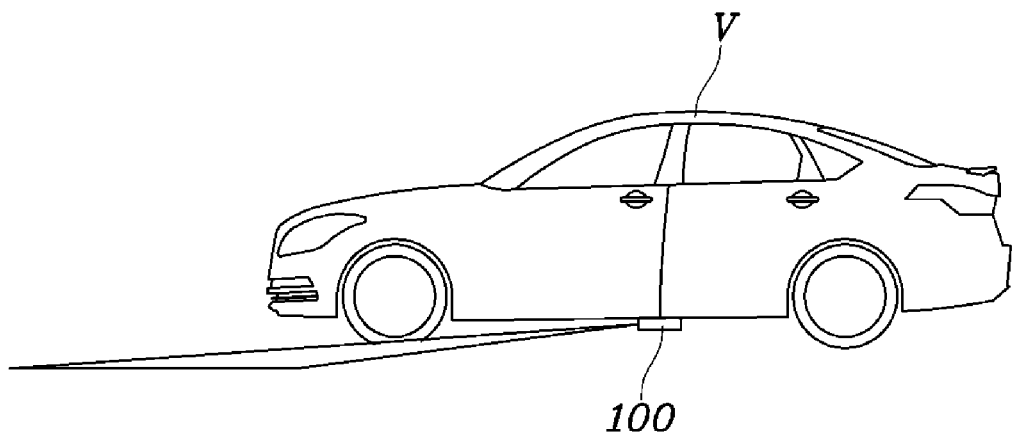

As shown in FIG. 4, the light source 10, the scanning mirror 20, and the reflector 30 are mounted on the lower portion of the vehicle V, whereby it is possible to avoid blocking the traveling path of the light due to the shape of the vehicle V when the light is emitted around the vehicle V and to minimize glare which may be caused in the eyes of pedestrians and/or drivers of other vehicles when the light is emitted from the lower portion of the vehicle V forward, rearward, and sideways thereof. Additionally, the light source 10, the scanning mirror 20, and the reflector 30 may be centrally positioned at the lower portion of the vehicle V such that the amount of light emitted around the vehicle V forward, rearward, and sideways is not excessively different.

Meanwhile, the reflector 30 includes a reflecting portion 32 provided to have an inclined surface or a curved surface; and a driving portion 34 having the reflecting portion 32 provided thereon and transmitting rotational power to the reflecting portion 32 such that the reflecting portion 32 is rotated in 360 degree angles with respect to a vertical axis.

As shown in FIG. 2, the reflector 30 may be comprised of the reflecting portion 32 and the driving portion 34. The reflecting portion 32 may have the inclined or curved surface such that the light reflected by the scanning mirror 20 travels to the road surface around the vehicle V. Herein, the reflecting portion 32 has a curved surface that can secure a large reflection angle of the light, such that the reflected light passes through the lower portion of the vehicle V and thus is efficiently projected outside the vehicle V.

The driving portion 34 may be a motor and has the reflecting portion 32 provided thereon such that the reflecting portion 32 is rotated in 360 degree angles with respect to the vertical axis. Herein, the vertical axis indicates a height direction of the vehicle V. When the rotational power is transmitted from the driving portion 34 to the reflecting portion 32, the reflecting portion 32 is rotated with respect to the vertical axis, resulting in the light reflected by the scanning mirror 20 selectively traveling forward, rearward, and sideways of the vehicle V.

In an exemplary embodiment of the present invention described above, as shown in FIG. 1, the light source 10 is mounted to emit the light in a longitudinal direction of the vehicle V, and the scanning mirror 20 is positioned in a horizontal direction of the light source 10 and is mounted such that the light emitted from the light source 10 is reflected and travels in a vertical direction of the vehicle V, while the reflector 30 is positioned in a vertical direction of the scanning mirror 20 and is provided such that the light reflected by the scanning mirror 20 is projected onto the road surface.

In other words, the light source 10 and the scanning mirror 20 are positioned to face each other horizontally and secured in position, while the reflector 30 is positioned in the vertical direction of the scanning mirror 20. Due to the provided configuration, the light emitted from the light source 10 travels horizontally to be incident upon the scanning mirror 20 and then the light reflected by the scanning mirror 20 is deflected vertically to be incident upon the reflector 30, resulting in the light reflected by the reflector 30 being finally projected onto the road surface around the vehicle V. Though the light source 10, the scanning mirror 20, and the reflector 30 may be varied in position, the light source 10 and the scanning mirror 20 are positioned horizontally while the reflector 30 is positioned vertically, avoiding interference of respective components with the traveling path of the light emitted from the light source 10.

Furthermore, since the light source 10 and the scanning mirror 20 are secured in position whereas only the reflector 30 is rotatable, it is easy to mount the respective components. Additionally, only the reflector 30 is rotated to cause the light to change a direction of travel thereof, resulting in the entire configuration being simplified.

Figure 5:
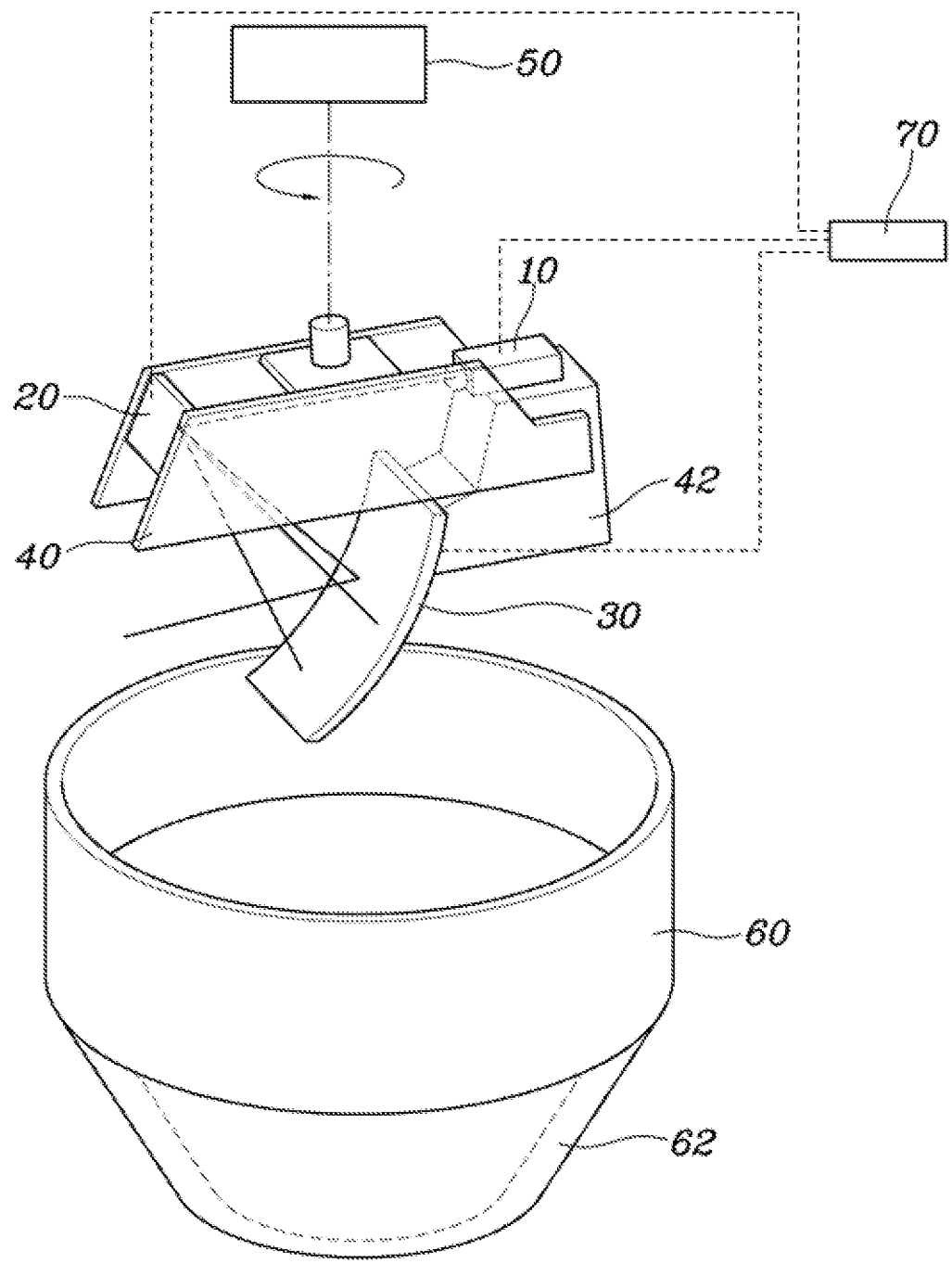

On the other hand, as shown in FIG. 5, the light source 10, the scanning mirror 20, and the reflector 30 may be configured as a single module, such that the light source 10 and the scanning mirror 20 are rotated in conjunction with a rotation of the reflector 30 in 360 degree angles.

Due to the present configuration in which the light source 10, the scanning mirror 20, and the reflector 30 are rotated in 360 degree angles simultaneously, it is possible to fix a traveling path along which the light emitted from the light source 10 travels through the scanning mirror 20 and the reflector 30. In other words, the light source 10, the scanning mirror 20, and the reflector 30 are rotatable simultaneously as a single module, whereby a direction of projection of light onto the road surface is different whereas the traveling path along which the light emitted from the light source 10 travels to the reflector 30 through the scanning mirror 20 is fixed.

To the present end, as shown in FIG. 5, the present invention may further include a rotary bracket 40 rotatably mounted on the vehicle V and on which the light source 10, the scanning mirror 20, and the reflector 30 are mounted. The rotary bracket 40 may be configured such that a first side thereof is provided with the light source 10 and a second side thereof is provided with the scanning mirror 20, and the reflector 30 may be positioned above or below the light source 10 and the scanning mirror 20.

Herein, a mounting position of the reflector 30 is determined depending on whether the external display lighting apparatus 100 of the vehicle according to an exemplary embodiment of the present invention is mounted on an upper portion or the lower portion of the vehicle V. When the external display lighting apparatus 100 of the vehicle is mounted on the lower portion of the vehicle V, the reflector 30 may be mounted on a lower portion of the rotary bracket 40.

As described above, the light source 10 and the scanning mirror 20 are positioned at the rotary bracket 40 to face each other horizontally, and the reflector 30 is positioned above or below thereof in the vertical direction of the scanning mirror 20, whereby the light emitted from the light source 10 travels to the second side to be incident upon the scanning mirror 20, and then the light reflected by the scanning mirror 20 travels to the first side upward or downward to be incident upon the reflector 30, resulting in the light reflected by the reflector 30 being finally projected onto the road surface around the vehicle V.

Though the reflector 30 is provided below the light source 10 and the scanning mirror 20 in FIG. 5, the reflector 30 may vary in mounting position vertically.

The rotary bracket 40 may be connected at an upper or lower end portion thereof with an actuating portion 50 transmitting rotational power to the rotary bracket 4, such that the rotary bracket 40 is rotated with respect to the vertical axis to thereby change a direction in which an image of the light is projected onto the road surface around the vehicle V.

Herein, the actuating portion 50 may be a motor and allows the rotary bracket 40 to be rotated in 360 degree angles with respect to the vertical axis. Accordingly, the light source 10, the scanning mirror 20, and the reflector 30 that are mounted on the rotary bracket 40 are rotated together to change the direction of travel of the light projected onto the road surface.

Meanwhile, as shown in FIG. 5, the rotary bracket 40 has an extending portion 42 extending upwardly or downwardly from the first side thereof, the extending portion 42 having the reflector 30 mounted thereon, such that the light emitted from the light source 10 travels to the second side to be incident upon the scanning mirror 20 and then the light reflected by the scanning mirror 20 travels downward to the first side to be incident upon the reflector 30.

In other words, the light emitted from the light source 10 travels to the second side to be incident upon the scanning mirror 20, and the light reflected by the scanning mirror 20 travels downward to the first side to travel to the reflector 30. This allows the light which is finally reflected by the reflector 30 and travels to be emitted externally without interfering with the scanning mirror 20.

In an exemplary embodiment of the present invention, the scanning mirror 20 is rotatably mounted on the rotary bracket 40.

As described above, since the rotary bracket 40 has the extending portion 42 and the reflector 30 is mounted on the extending portion 42, it is possible for the light finally emitted through the reflector 30 to be projected efficiently around the vehicle V without interfering with the light source 10 and the scanning mirror 20.

Meanwhile, as shown in FIG. 5, the present invention may further include a housing 60 secured to the vehicle V and covering the light source 10, the scanning mirror 20, and the reflector 30, the housing having a circumferential surface provided with a lens 62 projecting the light.

Since the housing 60 covers the light source 10, the scanning mirror 20, and the reflector 30 as described above, the respective components are prevented from contamination due to external foreign substances. Additionally, since the housing 60 has the circumferential surface provided with the lens 62, it is possible for the light finally emitted externally to be efficiently projected onto the road surface around the vehicle V. The housing 60 may be secured to a vehicle body by bolting.

Meanwhile, the present invention may further include a controller 70 controlling an on/off state of the light source 10, operation of the scanning mirror 20, and the rotational position of the reflector 30, the controller configured for controlling the light source 10, the scanning mirror 20, and the reflector 30 by receiving information on current driving conditions and a current driving state of the vehicle V such that the information on the current driving conditions and the current driving state of the vehicle V is projected onto the road surface around the vehicle V in a form of an image.

Herein, the controller 70 receives and collects information from various sensors such as a speed sensor, a laser sensor, and an ultrasonic sensor and controlling the light source 10, the scanning mirror 20, and the reflector 30 to allow a message according to the current driving conditions and the current driving state of the vehicle V to be projected onto the road surface around the vehicle V in a form of an image.

In other words, when the vehicle V operates in an automatic driving mode, the controller 70 turns on the light source 10, controls the operation of the scanning mirror 20, and controls the reflector 30 whereby a message indicating that the vehicle V operates currently in the automatic driving mode is projected onto the road surface around the vehicle V. This allows pedestrians and/or drivers of other vehicles to see the message projected onto the road surface around the vehicle V to recognize that the vehicle V operates in the automatic driving mode. Additionally, a current driving direction and the current driving conditions are projected onto the road surface around the vehicle V in a form of various images to be seen by pedestrians and/or drivers of other vehicles, resulting in an improvement of reliability of the vehicle V.

Figure 7:
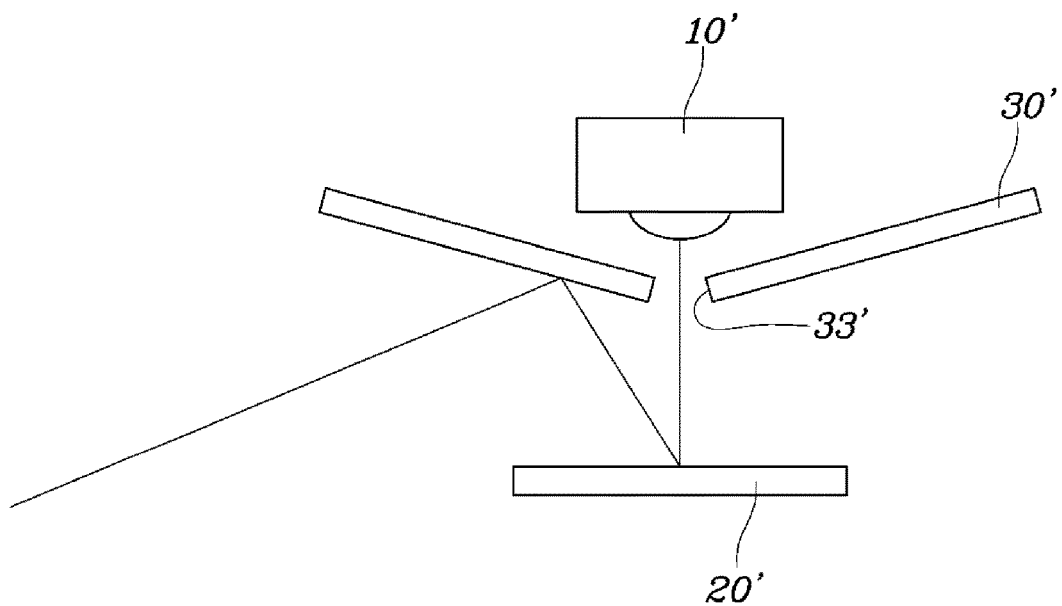
FIG. 7, FIG. 8 and FIG. 9 are views showing an external display lighting apparatus of a vehicle according to various exemplary embodiments of the present invention.
Figure 8:
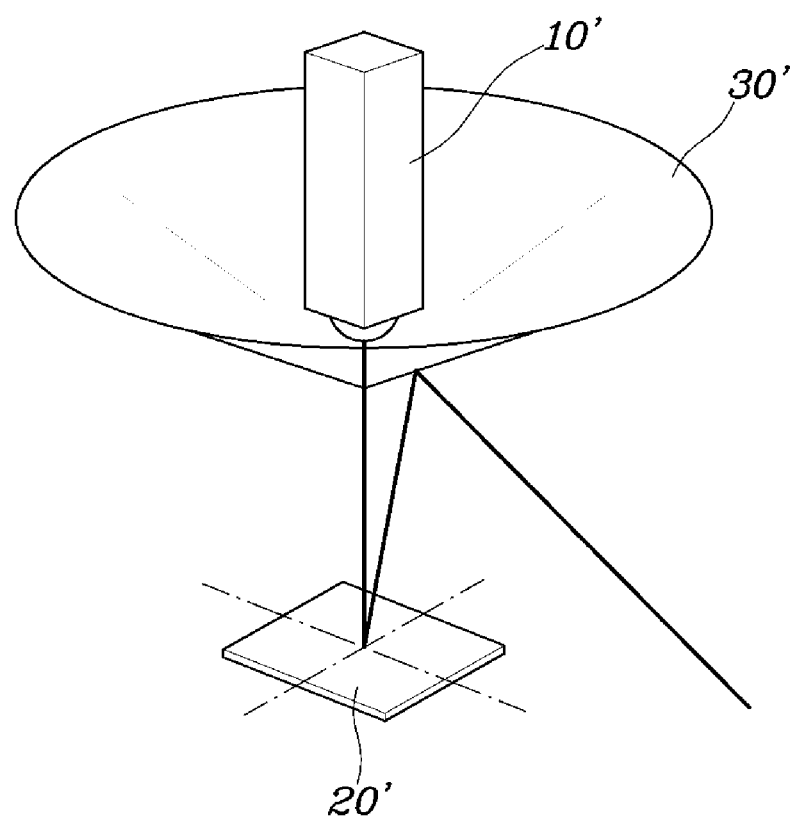

Meanwhile, as illustrated in FIGS. 7 and 8, an external display lighting apparatus 100 of a vehicle according to various exemplary embodiments of the present invention may include: a light source 10' emitting light; a scanning mirror 20' reflecting the light emitted from the light source 10' to change a traveling path of the light and configured to rotate by a predetermined angle to scan an image of reflected light; and a reflector 30' provided such that the light reflected by the scanning mirror 20' is incident thereupon and the incident light is reflected off a road surface, the reflector being configured to have a curved surface such that the light is projected onto the road surface around the vehicle V.

Herein, the light source 10' may be an LED, and the scanning mirror 20' may be a micro electro mechanical system (MEMS) scanning mirror configured such that the mirror oscillates in X-axis and Y-axis directions to cause the light emitted from the light source 10' to change in a reflection angle thereof, creating an image.

As described above, the light emitted from the light source 10' and reflected by the scanning mirror 20' travels to the reflector 30', and the reflector 30' reflects the light that has been reflected by the scanning mirror 20' to be projected onto the road surface around the vehicle V. The scanning mirror 20' changes the traveling path of the light, whereby the light is incident upon a predetermined portion of the curved surface of the reflector 30' according to an operation state of the scanning mirror 20' and then the light reflected off the curved surface of the reflector 30' is selectively projected onto front, rear, left and right portions of the road surface around vehicle V.

In other words, the light reflected by the reflector 30' is selectively projected onto the road surface around the vehicle V according to the operation state of the scanning mirror 20', resulting in pedestrians and/or drivers of other vehicles ascertaining a message from the vehicle V.

Meanwhile, the light source 10', the scanning mirror 20', and the reflector 30' are mounted on a lower portion of the vehicle V, whereby it is possible to avoid blocking the traveling path of the light due to the shape of the vehicle V when the light is emitted around the vehicle V and to minimize glare which may be caused in the eyes of pedestrians and/or drivers of other vehicles when the light is emitted from the lower portion of the vehicle V forward, rearward, and sideways thereof.

Meanwhile, as shown in FIG. 7, the light source 10' is mounted to emit the light in a vertical direction of the vehicle V, and the reflector 30' is positioned in a vertical direction of the light source 10' and has a through portion through which the light emitted from the light source 10' passes, the reflector having a curved portion. The scanning mirror 20' is positioned in a vertical direction of the reflector 30' and reflects the light emitted from the light source 10' and passing through the reflector 30' such that the reflected light travels to the curved surface of the reflector 30'.

In other words, the light source 10' and the scanning mirror 20' are positioned to face each other vertically and secured in position, while the reflector 30' is located between the light source 10' and the scanning mirror 20'. Due to the provided configuration, the light emitted from the light source 10' passes through the reflector 30' to be incident upon the scanning mirror 20', and then the light reflected by the scanning mirror 20' is deflected vertically to be incident upon the reflector 30' again, resulting in the light reflected by the reflector 30' being finally projected onto the road surface around the vehicle V.

Herein, a direction in which the light is projected onto the road surface around the vehicle V is determined by operation of the scanning mirror 20'. The reflector 30' is secured in position and determines a direction of travel of the light according to the curved shape.

Figure 9:
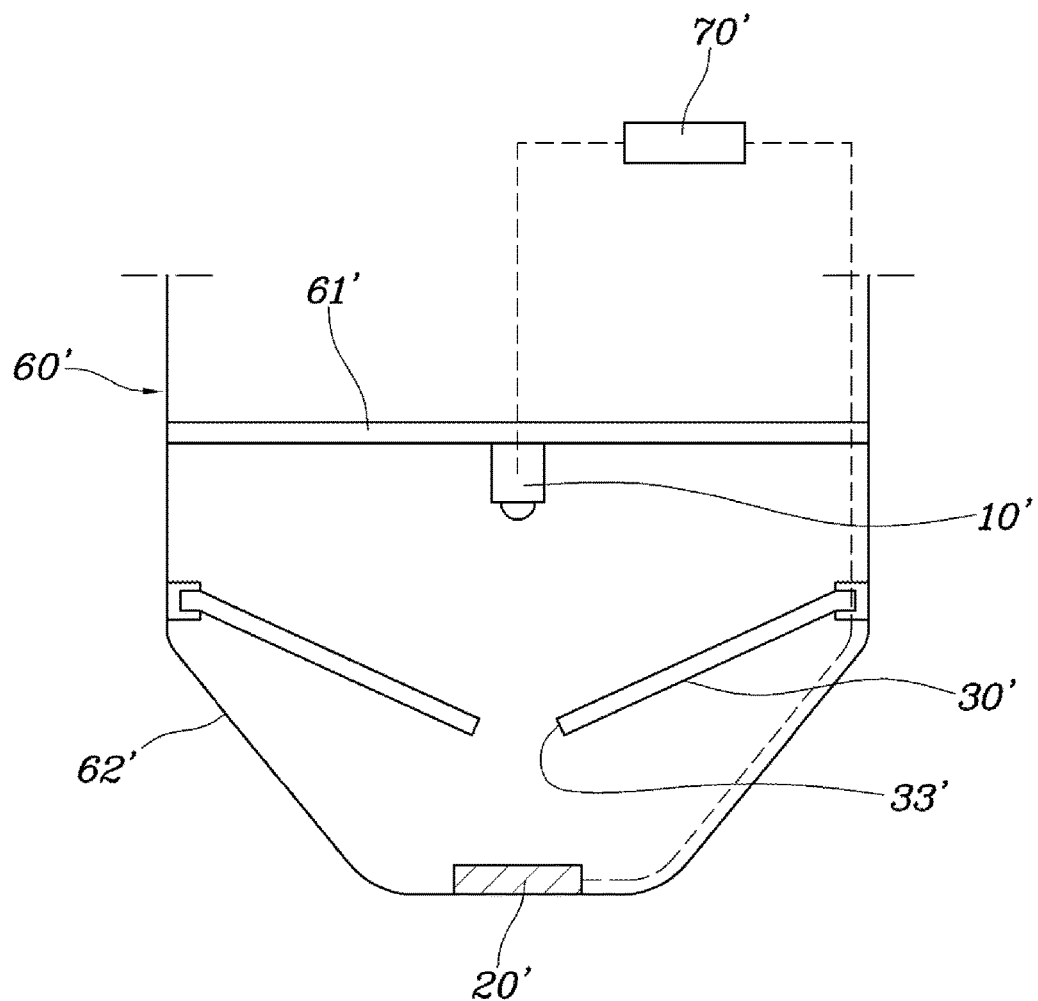

Meanwhile, as shown in FIGS. 7 and 9, the reflector 30' may have a through hole 33' through which the light emitted from the light source 10' passes, and an inclined surface or the curved surface defined radially around the through hole 33'. The through hole 33' is centrally formed through the reflector 30', facilitating the light source 10' and the scanning mirror 20' being provided vertically around the through hole 33'. This allows the light emitted from the light source 10' to pass through the through hole 33' of the reflector 30' and travel to the scanning mirror 20'. Herein, the direction of travel of the light is changed according to the operation state of the scanning mirror 20' and thus the light travels to the predetermined portion of the curved surface of the reflector 30', and then the light reflected by the reflector 30' is projected onto the road surface around the vehicle V. The light source 10' and the scanning mirror 20' are disposed vertically with respect to the through hole 33' of the reflector 30' as described above, and thus the present invention can simplify the layout.

Meanwhile, as shown in FIG. 9, the present invention may further include a housing 60' secured to the vehicle V and covering the light source 10', the scanning mirror 20', and the reflector 30', the housing having a circumferential surface provided with a lens 62' projecting the light.

Since the housing 60' covers the light source 10', the scanning mirror 20', and the reflector 30' as described above, the respective components are prevented from contamination due to external foreign substances. Additionally, since the housing 60' has the circumferential surface provided with the lens 62', it is possible for the light finally emitted externally to be efficiently projected onto the road surface around the vehicle V. The housing 60' may be secured to a vehicle body by bolting.

The housing 60' has a securing bracket 61' provided therein and on which the light source 10' is mounted, and the scanning mirror 20' is secured to the housing 61' to be distanced from the securing bracket 61'. The scanning mirror 20' may be mounted on an internal bottom surface of the housing 60' in the vertical direction of the light source 10'. The light source 10', the reflector 30', and the scanning mirror 20' are sequentially mounted in the housing 60'. In other words, the light source 10' is mounted on the securing bracket 61' secured in the housing 60', the scanning mirror 20' is secured on an internal surface of the housing 60' in the vertical direction of the light source 10', and the scanning mirror 20' is secured to the internal bottom surface of the housing 60'. Accordingly, the light source 10', the scanning mirror 20', and the reflector 30' are positioned in the housing 60'.

Herein, the scanning mirror 20' is driven with electric power supplied thereto and thus may be connected to electric power wiring. The electric power wiring is provided along the internal surface of the housing 60' on a traveling path along which the light reflected by the reflector 30' travels to wheels of the vehicle V, preventing the light projected onto the road surface from interfering with the electric power wiring.

Meanwhile, the present invention may further include a controller 70' controlling an on/off state of the light source 10' and operation of the scanning mirror 20', the controller configured for controlling the light source 10' and the scanning mirror 20' by receiving information on current driving conditions and a current driving state of the vehicle V such that the information on the current driving conditions and the current driving state of the vehicle is projected onto the road surface around the vehicle V in a form of an image.

Herein, the controller 70' receives and collects information from various sensors such as a speed sensor, a laser sensor, and an ultrasonic sensor and controlling the light source 10' and the scanning mirror 20' to allow a message according to the current driving conditions and the current driving state of the vehicle to be projected onto the road surface around the vehicle V in a form of an image.

In other words, when the vehicle V operates in an automatic driving mode, the controller 70' turns on the light source 10' and controls the operation of the scanning mirror 20 in a direction in which the light is to be projected. Accordingly, the light emitted from the light source 10' is reflected by the scanning mirror 20' to travel to the reflector 30' and is then finally reflected by the reflector 30', whereby the message indicating that the vehicle V operates currently in the automatic driving mode is projected onto the road surface around the vehicle V. This allows pedestrians and/or drivers of other vehicles to see the message projected onto the road surface around the vehicle V to recognize that the vehicle V operates in the automatic driving mode. Additionally, a current driving direction and the current driving conditions are projected onto the road surface around the vehicle V in a form of various images to be seen by pedestrians and/or drivers of other vehicles, resulting in an improvement of reliability of the vehicle V.

According to the external display lighting apparatus of the vehicle having the above-described configuration, it is possible to display the current driving conditions and the current driving state of the vehicle to be seen by pedestrians and/or drivers of other vehicles, achieving an improvement of reliability of the vehicle. Additionally, it is possible for pedestrians and/or drivers of other vehicles to recognize the current driving state of the vehicle in advance to cope with situations thereafter, achieving an improvement of safety of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external display lighting apparatus of a vehicle, the apparatus comprising:
   a light source emitting light;
   a scanning mirror reflecting the light emitted from the light source to change a traveling path of the light and configured to rotate in a predetermined angle to scan an image of reflected light;
   a reflector provided such that the light reflected by the scanning mirror is incident thereupon and the incident light is reflected off a road surface, the reflector being configured to be rotatable such that the light is projected onto the road surface around the vehicle; and
   a housing secured to the vehicle and covering the light source, the scanning mirror, and the reflector, the housing having a circumferential surface provided with a lens projecting the light.

2. The apparatus of claim 1, wherein the light source, the scanning mirror, and the reflector are positioned at a lower portion of the vehicle.

3. The apparatus of claim 1,
   wherein the scanning mirror is a micro-mirror, and
   wherein the micro-mirror oscillates in a first axis direction and a second axis directions to cause the light emitted from the light source to change in a reflection angle thereof, creating the image.

4. The apparatus of claim 1, wherein the reflector includes:
   a reflecting portion provided to have an inclined surface or a curved surface; and
   a driving portion coupled to the reflecting portion and transmitting a rotational power to the reflecting portion such that the reflecting portion is rotated in 360 degree angles with respect to a vertical axis.

5. The apparatus of claim 1,
   wherein the light source is provided to emit the light in a longitudinal direction of the vehicle,
   wherein the scanning mirror is positioned in a horizontal direction of the light source and is provided such that the light emitted from the light source is reflected thereby and travels in a height direction of the vehicle, and
   wherein the reflector is positioned in a vertical direction of the scanning mirror and is provided such that the light reflected by the scanning mirror is projected onto the road surface.

6. The apparatus of claim 1, wherein the light source, the scanning mirror, and the reflector are configured as a single module, such that the light source and the scanning mirror are rotated in conjunction with a rotation of the reflector in 360 degree angles.

7. The apparatus of claim 1, further including:
   a rotary bracket rotatably mounted on the vehicle and on which the light source, the scanning mirror, and the reflector are provided, wherein a first side of the rotary bracket is provided with the light source and a second side of the rotary bracket is provided with the scanning mirror, and the reflector is positioned above or below the light source and the scanning mirror.

8. The apparatus of claim 7, wherein the scanning mirror is rotatably mounted on the rotary bracket.

9. The apparatus of claim 7, wherein the rotary bracket is connected at an upper or lower end portion thereof with an actuating portion transmitting a rotational power to the rotary bracket, such that the rotary bracket is rotated with respect to the vertical axis.

10. The apparatus of claim 7, wherein the rotary bracket has an extending portion extending upwardly or downwardly from a first side of the rotary bracket, the extending portion having the reflector provided thereon, such that the light emitted from the light source travels to a second side of the rotary bracket to be incident upon the scanning mirror and then the light reflected by the scanning mirror travels downward to the first side to be incident upon the reflector.

11. The apparatus of claim 1, further including:
a controller configured for controlling an on or off state of the light source, operation of the scanning mirror, and a rotational position of the reflector, the controller configured for controlling the light source, the scanning mirror, and the reflector by receiving information on a current driving condition and a current driving state of the vehicle such that the information on the current driving condition and the current driving state of the vehicle is projected onto the road surface around the vehicle in a form of the image.

12. An external display lighting apparatus of a vehicle, the apparatus comprising:
a light source emitting light;
a scanning mirror reflecting the light emitted from the light source to change a traveling path of the light and configured to rotate in a predetermined angle to scan an image of reflected light;
a reflector provided such that the light reflected by the scanning mirror is incident thereupon and the incident light is reflected off a road surface, the reflector being configured to have a curved surface such that the light is projected onto the road surface around the vehicle; and
a housing secured to the vehicle and covering the light source, the scanning mirror, and the reflector, the housing having a circumferential surface provided with a lens projecting the light.

13. The apparatus of claim 12, wherein the light source, the scanning mirror, and the reflector are positioned at a lower portion of the vehicle.

14. The apparatus of claim 12, wherein the scanning mirror is a micro-mirror wherein the micro-mirror oscillates in a first axis direction and a second axis direction to cause the light emitted from the light source to change in a reflection angle thereof, creating the image.

15. The apparatus of claim 12,
wherein the light source is provided to emit the light in a vertical direction of the vehicle,
wherein the reflector is positioned in a vertical direction of the light source and has a through portion through which the light emitted from the light source passes, the reflector having a curved portion, and
wherein the scanning mirror is positioned in a vertical direction of the reflector and reflects the light emitted from the light source and passing through the reflector such that the reflected light travels to the curved surface of the reflector.

16. The apparatus of claim 15, wherein the reflector has a through hole through which the light emitted from the light source passes, and an inclined surface or the curved surface defined radially around the through hole.

17. The apparatus of claim 12,
wherein the housing has a securing bracket provided therein and on which the light source is provided,
wherein the scanning mirror is secured to the housing to be distanced from the securing bracket,
wherein the reflector has a through hole through which the light emitted from the light source passes, and
wherein the scanning mirror is mounted on an internal bottom surface of the housing in a vertical direction of the light source and facing the light source through the through hole.

18. The apparatus of claim 12, further including:
a controller configured for controlling an on or off state of the light source and operation of the scanning mirror, the controller configured for controlling the light source and the scanning mirror by receiving information on a current driving condition and a current driving state of the vehicle such that the information on the current driving condition and the current driving state of the vehicle is projected onto the road surface around the vehicle in a form of an image.

\* \* \* \* \*